July 8, 1930.   G. C. THOMAS, JR   1,770,115
CABLE CONNECTER
Filed June 1, 1927
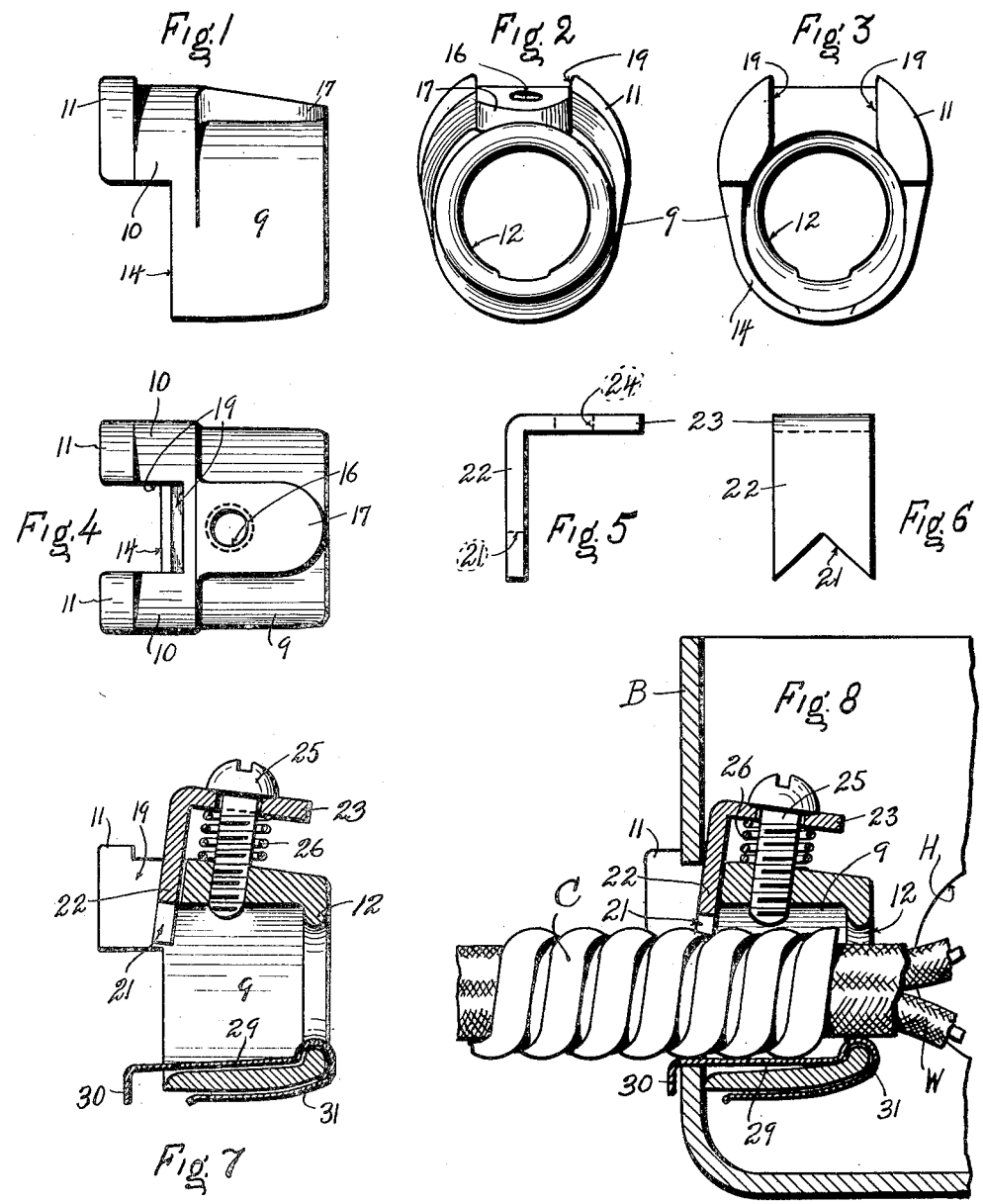
INVENTOR
George C. Thomas, Jr.
BY
Bohleber & Ledbetter
ATTORNEYS

UNITED STATES PATENT OFFICE

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY

CABLE CONNECTER

Application filed June 1, 1927. Serial No. 195,661.

This invention relates to cable and box connecting means and particularly to cable connecters to fasten cable to electric fixture and outlet boxes.

An object of the invention is to produce a cable connecter of the exposed box hole edge type and, among other things, improved in respect to the location of its single operating means, which, in this improvement, is preferably placed inside a box since the invention affords means to prevent the screw or cable clamp from engaging the cable and backing it out of the box hole.

Another object of the invention is to produce a connecter which includes a spring lifted jaw to engage the cable together with a connecter retaining spring which supports the connecter in the box hole without the necessity of the mechanic holding it with one hand while he inserts the cable with the other. In other words, it is an object to combine double spring means with a connecter to hold a clamp jaw normally out of engagement with a cable and to hold the connecter member in the box. By the provision of this double spring means, the operator's hands are free so that he is not required to hold the connecter in the box nor does he have to hold the cable clamp means out of engagement with the cable during its insertion into the connecter.

A still further object of the invention is to produce improved clamp means, useful with any type of connecter member, and which is actuated by and tightened up by operating means, such as a screw, to grip the cable and simultaneously anchor the connecter in the box hole.

The accompanying drawing illustrates an example of the connecter serving to disclose its principles, construction, and mode of use, wherein:

Figures 1, 2, 3 and 4, show, respectively, side, inner end, and outer end elevations, and a plan view of the connecter member before the accessory parts are assembled therewith to complete its structure.

Figures 5 and 6 show respectively a side and end elevation of an improved jaw clamp being part of the cable clamping means to engage a cable.

Figure 7 shows a longitudinal sectional view of the complete connecter.

Figure 8 shows a box assembly view in longitudinal section with a cable, a connecter, and a box anchored together.

Electric fixture or outlet boxes B are ordinarily made with knockout opening or holes H to receive the cable C and a connecter 9 to fasten the cable in the box, and to pass the wires W into the box in the usual way, and thus make electric connection inside the box with other circuit wires leading thereto.

Referring further to the drawings and describing first the structure of an example of the connecter member as in the first four views, there is shown a member 9 of sleeve or other suitable form. This connecter member 9 is of suitable size to fit into a box hole and includes a body means so shaped and formed as to leave exposed a portion of the box hole edge, and at the same time it covers a portion of the box hole edge. It includes anchorage means, such for example as abutments, between which rests the box wall to fix or anchor the connecter in a box hole. To this end, the sleeve 9 carries an extension 10 designed to project through the box hole together with an ear or ribs 11, one or more thereof to bear on one side of the box. This end of the sleeve is open to receive the cable C and comprises a straight abutment edge 14 preferably transverse to the sleeve axis and designed to rest against the other side of the box wall. The inner end of the sleeve 9 may if desired be restricted in size to form a bushing 12 against which the ragged or sharp edge of the cable C comes to rest and through which is passed the cable wires W into the box.

Thus the box wall rests between the abutment ears 11 and sleeve abutment end 14 which are spaced to receive the box wall, and in this way the member 9 is anchored in the box hole against longitudinal movement as shown in Figure 8, and this anchorage means 11—14 becomes effective by reaction when the clamping means is actuated to grip a cable as will be further described.

The sleeve or connecter member extension 10 is preferably raised somewhat above the sleeve 9 so that the circular sleeve portion 9 which is diametrically opposite to the extension 10 is caused to be disposed eccentrically to the box hole edge thereby permitting the cable C to rest directly against the sharp edge defining the box hole H. The extension 10 tends to slightly offset the sleeve in the box hole to attain that degree of eccentricity required to curve the box hole edge into the sleeve end 14 for direct cable contact.

Provision for connecter operating means resides in a tapped hole 16 formed through the sleeve 9 and carrying a screw 25. To insure a sufficient amount of stock to carry the threaded screw hole 16, a rib 17 may be extended along the sleeve wall 9 if desired. This screw is designed as clamp operating means by which to actuate a cable clamp jaw as will be explained.

A vertically extending slot or open guide way 19 is formed through the extension 10 proximate to or in the sleeve and a clamp plate 22 is slidably carried within this slot. Since the clamp plate guide way 19 is preferably formed centrally through the sleeve extension 10, it follows that this opening is disposed substantially opposite the connecter portion which rests eccentrically to and exposes the box hole edge. Furthermore I may prefer to form this opening 19 in the sleeve so that it comes within the box B when the connecter is placed therein. This is apparent from Figure 8.

Improved cable clamping means is employed to grip the cable C directly against the exposed box hole edge and an important feature resides in appropriately positioning the clamp and the point of application of its pressure against the cable by which pressure is applied to the cable along the plane of the box wall or may be at a slight angle so that the pressure is directed towards the opposite edge of the box wall. To this end a clamp jaw 21 of any suitable shape is formed on one end, the inner end of the slide 22, and a foot 23 is integral with and at an angle to the slide 22, the slide being mounted movably in the guide way 19. The cable clamp 22—23 is apertured at 24 to receive an operating screw means 25 which turns freely in the aperture 24 and is screw threaded into the tapped hole 16 of the connecter member. I have therefore provided a right angle cable clamp member 22—23 including the jaw end 21 and screw engaged end 23, the former being operable transversely of the cable axis and the latter being disposed about parallel thereto.

A spring 26, as for example a coil spring, is confined under compression on the screw 25 between the clamp and connecter member, and this spring holds the cable clamp 22—23 and its jaw 21 normally away from the center of the member 9 so that the jaw end 21 stands as high in the sleeve as movement thereof is permitted by the outwardly moved position of the operating screw 25. In this way the spring 26 holds the jaw 21 away from the cable C so that the latter may be easily inserted into the connecter without engagement against the clamp jaw 21.

It is now seen that the cable clamping means provided in the clamp 22—23, the operating screw 25, and the spring 26, affords means for normally holding the clamp jaw 21 out of engagement with the cable when inserted and thus the mechanic does not have to hold the clamp plate 22—23 up away from the cable as he inserts the latter in the connecter. This arrangement aids in installing a cable in the box. A description will now be given of means to retain the connecter 9 as a whole in the box while the mechanic inserts the cable, and thus double provision is had for insuring the freedom of the mechanic's fingers from having to hold the connecter or its parts while manipulating the cable C and wires W into the box.

In order to hold the connecter in position in the box hole, there is provided a flat leaf spring 29, the outer hook end 30 of which is flexibly free, while the inner longer hook end 31 embraces the wall of the sleeve 9. The spring hook end 30 overhangs the abutment sleeve end 14 a distance substantially equal to the thickness of the box wall. In this way, the flexible hook end 30 rests at one side of the box wall, as on the outside thereof, while the sleeve end 14 rests on the inside thereof.

To insert the connecter sleeve 9 into the box hole, it is merely necessary to tip the connecter at an angle to the axis of the box hole, first placing the spring hook 30 through the box hole and displacing the connecter laterally downward until the abutment ears 11 pass through the box hole, whereupon the reaction of the spring 29 snaps the connecter 9 upwardly thereby seating the extension 10 against the upper portion of the box hole edge. In this way, the spring hook 30 and ears 11 are both disposed outside the box hole to anchor the connecter against displacement inwardly, while the straight abutment sleeve end edge 14 is disposed on the inside and against the box wall to anchor the connecter against displacement outwardly. The spring 29 therefore snaps the connecter abutment box hole edge anchorage means 11—14 into place.

The screw 25 is now run down which compresses the jaw lifting spring 26 thereby forcing the clamp jaw 21 into engagement with the cable C, thus gripping the cable between the jaw 21 and exposed portion of the box hole edge H. The reaction of the screw 25 acting through the connecter 9 positively seats the connecter extension 10 firmly against the upper portion of the box hole edge thereby simultaneously anchoring the connecter in the box with one and the same operation which fixes the cable in the box.

An important feature in this connecter as above stated, resides in the double spring means by which the connecter 9 is held by the connecter retention spring 29 in the box hole and by which the cable clamp jaw 21 is held away from the cable C while the latter is inserted because these provisions free the mechanic's fingers for other work at hand. A still further important feature in the connecter relates to the proper position of the slidable jaw 21. This jaw is placed as shown directly above the exposed box hole edge, i. e., the point of jaw pressure is applied in the plane of the box wall. By reference to Figure 8, this feature is understood. The position of the guide groove 19 is such that the slide 22 is disposed at a slight angle to the axis of the sleeve 9, and thus while the slide 22 is not in the plane of the box wall where it first enters the sleeve, still the jaw end 21 is in the plane of the box wall where said jaw engages the cable C.

The cable C is therefore gripped between what amounts to an encircling jaw, since the movable jaw 21 may be V-shaped or curved as desired, to conform with the circular edge of the box hole. It may therefore be stated that the exposed circular portion of the box hole edge H forming a stationary jaw together with the movable jaw end 21 constitute encircling cable jaws designed in a unique way to circumscribe the cable with pressure at the box wall thereby evenly distributing pressure around the cable armor which insures an unusually firm anchorage of the cable to the box without the least danger of crushing the cable due to the fact that the pressure is not concentrated at any point but is uniformly distributed about the circumference of the cable.

What amounts to further importance in a novel way is that the encircling cable jaw 21—H squeezes the cable at the box wall in the plane of the box wall so that if a relatively short length only of cable protrudes into the box or into the connecter, the cable gripping function is still effective. Also the encircling jaw action about the cable acting in the plane of the box wall obviates all possibility of the cable creeping or slipping out of the box which may some time occur where the clamping action is inside the box too near the cable end, but which is guarded against in the provisions of this connecter.

I have therefore produced a cable connecter with body means in the extension 10 to fit into a box hole and expose its edge, and with a portion 9 too large to pass through the box hole. It is provided with an operating screw which neither engages the box wall or cable. Its cable clamp is of maximum efficiency because clamp jaws grip the cable in the plane of and at the box wall and thereby prevent outward creeping of the cable in case the latter is inserted a short distance only into the box hole. It is unnecessary to provide a screw hole in the box by which the connecter is screw fastened thereto as in many forms of connecters.

The connecter is easily removed and replaced and consists of the single operating means 25 designed to actuate the cable clamp jaw and designed to simultaneously render effective the connecter anchorage means 11—14 because the screw, in operating the cable clamp, reacts and thereby renders effective the anchorage means 11—14. Thus the connecter extension 10 is positively seated against the box hole edge so that the inside and outside abutment means 11—14 becomes anchored at the same time that the clamp jaw goes down against the cable to grip the latter between the jaws included in the box hole H and inner end 21 of slide 22.

What I claim is:

1. Cable and box connecting means comprising, a box provided with a connecter and cable receiving hole; a connecter member suitable in size to fit into the box hole, and formed to expose a portion of the box hole edge to a cable; including box hole anchorage means carried on the connecter to fix the connecter to the box; a spring having one end thereof attached to one end of the connecter member and the other end of said spring being flexibly free and extended beyond the other end of the connecter; said free spring end susceptible to yielding action when the connecter member is inserted in the box hole, and the reaction of which snaps the member into position to engage the anchorage means against the box hole edge, which retains the connecter in place before the cable is inserted; and cable clamping means to grip the cable directly against the exposed box hole edge including, a jaw mounted on the connecter member and movable substantially transverse to the axis of the cable inserted in the box hole, resilient means interposed between the jaw and connecter member, to retain the jaw in normal uplifted position out of the way of the cable to be received into the box hole; and an operating device carried with the connecter member engaging the jaw to overcome the resilient means and to force the jaw against the cable.

2. Cable box and connecting means comprising, a box provided with a connecter and cable receiving hole, a member suitable in size and form to fit into a box hole and expose a portion of the box hole edge to a cable, box hole anchorage means carried with the member to fix it in the box hole, a guide way opening being provided in the member inside the box and substantially opposite to the exposed box hole edge portion, a clamp jaw slidable through the opening to grip a cable against the exposed box hole edge, and operating means inside the box to force the jaw against the cable and render effective the box hole anchorage means.

3. Cable and box connecting means comprising, a box with a knockout, a connecter member including anchorage means to anchor it in the knockout, said member being formed to expose a portion of the circular edge thereof used as a fixed jaw, a clamp slidable transversely to the cable axis through a guide way formed in the member adjacent the box wall, a cable jaw formed on the clamp and disposed in the plane of the box wall and movable toward the fixed jaw; and operating means carried with the connecter to move one jaw toward the other, gripping a cable therebetween, and rendering effective the anchorage means.

4. A connecter comprising a member including anchorage means to fix it in a box hole and means to expose a portion of the box hole edge to a cable, a spring retainer carried on the member to engage a box wall and snap the anchorage means into position, a cable clamp, operating means to actuate the clamp, and spring means to normally hold the clamp away from the cable.

5. A connecter comprising a member including anchorage means to fix it in a box hole and means to expose a portion of the box hole edge to a cable, an opening being formed in the member, a cable clamp movably confined in the opening and including a clamp jaw, a screw carried in the member engaging the cable clamp to force the jaw against a cable, and means to normally hold the jaw away from the cable.

6. A connecter comprising a member including anchorage means to fix it in a box hole and means to expose a portion of the box hole edge to a cable, an opening being formed in the member; a cable clamp having a slide movably confined in the opening and projecting externally of the member and including, a clamp jaw formed on the inner end of the slide, and a foot carried on the outer end of the slide; a screw freely engaging the foot of the cable clamp and screw-threaded into the member.

7. A connecter as defined in claim 6 but characterized by mounting a coil compression spring on the screw between the member and the foot to hold the clamp jaw away from a cable.

8. A connecter comprising a member including anchorage means to fix it in a box hole, said member being formed to expose a portion of the hole edge as a stationary circular jaw against which a cable rests, a movable jaw and means mounting it on the member in the plane of the box wall, and operating means to force the movable jaw toward the exposed box hole edge to grip a cable thereagainst.

9. A connecter comprising, a member and anchorage means to fix it in a box, a screw mounted in the member, an opening provided through the wall of the member, a clamp mounted in the opening to project therethrough and movable transversely of the member, a jaw formed on one end of the clamp, and a screw engaging the projecting portion of the clamp to force its jaw against a cable.

10. A connecter as defined in claim 9 but characterized by spring means expanding against the clamp to normally hold the jaw away from a cable.

11. A connecter as defined in claim 9 but characterized by two springs, one of which is carried with the member to engage the clamp and hold the jaw away from a cable, and the other of which is carried with the member and includes a flexibly free end adapted to yieldingly hook into a box hole and thereby engage the box wall to retain the connecter in the box.

12. A connecter comprising a sleeve which includes anchorage means to fix it in a box hole and means to expose a part of the hole edge, said sleeve having an opening formed therein adjacent the anchorage means, a slide plate mounted in the opening and projecting externally of the sleeve for movement transversely of the sleeve axis, a jaw on the inner end of the slide plate, and means cooperating with the outer end thereof to force the jaw against a cable.

13. A connecter comprising a sleeve which includes anchorage means to fix it in a box hole and means to expose a part of the hole edge, said sleeve having an opening extending through the sleeve wall adjacent the anchorage means, a slide plate mounted in the opening for movement transversely of the sleeve axis, a jaw on the inner end of the slide plate, the outer end of the slide plate being bent at an angle and provided with an aperture, and a screw free in the aperture and threaded into the sleeve.

14. A connecter as defined in claim 13 but characterized by mounting a coil spring on the screw between the sleeve and outer bent end of the slide plate to normally hold the jaw away from a cable.

15. A connecter comprising a sleeve, box hole anchorage abutments formed thereon, and being provided with a groove proximate one end of the sleeve, a clamp embodying a right angle member with one portion slidably confined in the groove and the other portion disposed outside and substantially parallel to the sleeve, a screw disposed for free rotation through the outside clamp portion and threaded into the sleeve, a spring held in place by the screw between the sleeve and outside clamp portion.

16. A connecter comprising a sleeve including an extension to project through a box hole, a groove formed through the extension providing a clamp guide way in the sleeve inside a box, a jaw plate slidably retained in the guide way with its outer end bent into parallel relation with the sleeve axis, a cable gripping jaw formed on the inner end of the jaw plate proximate the plane of the box wall, and a screw threaded into the connecter inside the box and passed through the outer bent end of the jaw plate.

17. A connecter comprising, a member including anchorage means to fix it in a box hole, said member being formed to expose a portion of the hole edge as a stationary circular jaw against which a cable rests, a movable jaw and mounting means carrying it on the member in the plane of the box wall to cooperate with the stationary jaw, said jaw mounting means including a slide confined in a guide way formed through the member at an angle to a box wall by which said jaw is projected into the plane of the box wall and within the box hole, and operating means to force the movable jaw toward the exposed box hole edge to grip a cable thereagainst.

In testimony whereof I affix my signature.

GEORGE C. THOMAS, Jr.